(12) United States Patent
Park (10) Patent No.: US 12,485,781 B2
(45) Date of Patent: Dec. 2, 2025

(54) CHARGING CONNECTOR FOR VEHICLE

(71) Applicant: YURA CO., LTD., Hwaseong-si (KR)

(72) Inventor: Soo Hwan Park, Incheon (KR)

(73) Assignees: YURA CO., LTD., Hwaseong-si (KR); YURA CORPORATION CO., LTD., Seongnam-si (KR)

( * ) Notice: Subject to any disclaimer, the term of this patent is extended or adjusted under 35 U.S.C. 154(b) by 811 days.

(21) Appl. No.: 17/744,093

(22) Filed: May 13, 2022

(65) Prior Publication Data

US 2022/0371457 A1 Nov. 24, 2022

(30) Foreign Application Priority Data

May 18, 2021 (KR) .......................... 10-2021-0064059

(51) Int. Cl.
*B60L 53/16* (2019.01)
*H01R 13/639* (2006.01)

(52) U.S. Cl.
CPC ............ *B60L 53/16* (2019.02); *H01R 13/639* (2013.01); *H01R 2201/26* (2013.01)

(58) Field of Classification Search
CPC .... B60L 53/16; H01R 13/639; H01R 2201/26
USPC ........................................................ 320/115
See application file for complete search history.

(56) References Cited

U.S. PATENT DOCUMENTS

| | | | |
|---|---|---|---|
| 2014/0113479 A1 | 4/2014 | Yoon | |
| 2014/0227909 A1* | 8/2014 | Kojima | B60L 53/16 |
| | | | 439/625 |
| 2016/0144728 A1* | 5/2016 | Harper | B60L 53/67 |
| | | | 320/109 |
| 2017/0229820 A1 | 8/2017 | Fuehrer et al. | |
| 2023/0382248 A1* | 11/2023 | Sirieix | B60L 53/12 |

FOREIGN PATENT DOCUMENTS

| | | | | |
|---|---|---|---|---|
| CN | 115402132 A | * | 11/2022 | |
| CN | 116505320 A | * | 7/2023 | ............. B60L 53/16 |
| CN | 116565614 A | * | 8/2023 | |
| CN | 116937215 A | * | 10/2023 | |
| CN | 117810771 A | * | 4/2024 | |
| CN | 118738917 A | * | 10/2024 | |

(Continued)

*Primary Examiner* — Suresh Memula (74) *Attorney, Agent, or Firm* — KILE PARK REED & HOUTTEMAN PLLC (57) ABSTRACT

Provided is a charging connector for a vehicle, which is coupled to an inlet charging part of an electrical vehicle. The charging connector includes an outlet terminal part electrically connected to an inlet terminal part installed inside the inlet charging part, a housing configured to provide an accommodation space, in which the outlet terminal part is accommodated, and a coupling space coupled to the inlet terminal part, and a rear holder installed at one side of the housing to prevent the outlet terminal part from being separated. The outlet terminal part includes a plurality of charging terminals coupled to the inlet terminal part and a prevention rib extending from the outside of the charging terminal in a radial direction and having a distal end supported at one side of the rear holder to prevent the charging terminal from begin separated, thereby facilitating assembly and providing improved durability and safety.

5 Claims, 7 Drawing Sheets

(56) References Cited

FOREIGN PATENT DOCUMENTS

| | | | |
|---|---|---|---|
| CN | 114498166 B * | 12/2024 | ............... B60L 53/16 |
| DE | 102020108267 A1 * | 9/2021 | |
| EP | 3 560 750 | 10/2019 | |
| EP | 4000993 A1 * | 5/2022 | ............... B60L 53/16 |
| EP | 4091865 A1 * | 11/2022 | ............... B60L 53/16 |
| JP | H02-128380 | 10/1990 | |
| JP | 2016-046219 | 4/2016 | |
| JP | 2017-174815 | 9/2017 | |
| KR | 2013-0022478 | 3/2013 | |
| KR | 102567027 B1 * | 8/2023 | |

* cited by examiner

CHARGING CONNECTOR FOR VEHICLE

CROSS-REFERENCE TO RELATED APPLICATIONS

This U.S. non-provisional patent application claims priority under 35 U.S.C. § 119 of Korean Patent Application No. 10-2021-0064059, filed on May 18, 2021, the entire contents of which are hereby incorporated by reference.

FIELD OF THE INVENTION

The present invention disclosed herein relates to a charging connector for a vehicle, and more particularly, to a charging connector for a vehicle, which is coupled to a charging inlet of an electric vehicle and used to charge the electric vehicle.

BACKGROUND ART

Recently, as environmental problems have become an issue, eco-friendly vehicles have been greatly emphasized to save energy and prevent environmental pollution. Thus, hydrogen fuel cell vehicles, biodiesel vehicles, and electric vehicles come into the spotlight as replacements for vehicles that receive driving power through an existing internal combustion engine.

Among them, the vehicle with the most active technology development means an electric vehicle, i.e., a vehicle using electricity as driving force. The electric vehicle is classified into an EV, a PHEV, and an HEV according to a method of using electric energy and a rate at which electricity is used as driving force, and each of the EV and PHEV is provided with a fast charging part and a slow charging part to receive power from the outside.

Here, since a high voltage is generated in the fast charging part and the slow charging part to charge the electric vehicle, there is a limitation, in which fixing force of a terminal part is lowered due to repeated detachment of a charging inlet part and the charging part of the vehicle to deteriorate electrical safety, and also, there is a limitation, in which workability and productivity are deteriorated so as to install an outlet terminal at a correct position.

SUMMARY OF THE INVENTION

To solve the above-mentioned limitations, the present invention provides a charging connector for a vehicle, in which a charging terminal installed inside the charging connector for the vehicle is easily installed and also is stably fixed to improve product durability and safety.

The present invention provides a charging connector for a vehicle, which is coupled to an inlet charging part of an electrical vehicle, the charging connector includes: an outlet terminal part electrically connected to an inlet terminal part installed inside the inlet charging part; a housing configured to provide an accommodation space, in which the outlet terminal part is accommodated, and a coupling space coupled to the inlet terminal part; and a rear holder installed at one side of the housing to prevent the outlet terminal part from being separated,
wherein the outlet terminal part includes: a plurality of charging terminals coupled to the inlet terminal part; and a prevention rib extending from the outside of the charging terminal in a radial direction and having a distal end supported at one side of the rear holder to prevent the charging terminal from begin separated.

The housing may have a first connection hole so that the plurality of charging terminals are installed in a predetermined pattern, the rear holder may include a body disposed outside the accommodation space and an extension part having a second connection hole that extends to the inside of the accommodation space to communicate with the first connection hole, and in the outlet terminal part, the charging terminals may be disposed to pass through the first and second connection holes, wherein a distal end of the prevention rib may be supported on the distal end of the extension part and disposed in the accommodation space.

The prevention rib may include: a connection end protruding along an outer circumferential surface of each of the charging terminals; a plurality of elastic cantilevers spaced a predetermined distance from the connection end to extend in the extension direction; and a support end bent from a distal end of each of the elastic cantilevers and disposed to face the extension part, wherein the outlet terminal part may pass through the second connection hole and be disposed in the accommodation space.

The elastic cantilever may extend from the connection end, wherein the elastic cantilever may have an inclined surface extending from the outer circumferential surface of the charging terminal so as to be gradually spaced apart in the radial direction.

The rear holder may include: a protection rib extending from the body to the outside of the accommodation space to protect a distal end of the housing; and a coupling rib extending to the outside of the accommodation space and provided with a hook protrusion at a distal end thereof so as to be hooked and fixed to a coupling groove defined in the accommodation space.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE PREFERRED EMBODIMENTS

Hereinafter, specific embodiments of the present invention will be described in detail with reference to the accompanying drawings. However, detailed descriptions of well-known functions or configurations are omitted so as not to obscure the gist of the present invention.

In addition, for convenience of description, a direction in which an inlet charging part and a charging connector for a vehicle are coupled to each other is defined as an extension direction, and a direction crossing the extension direction is defined as a radial direction.

Figure 1:
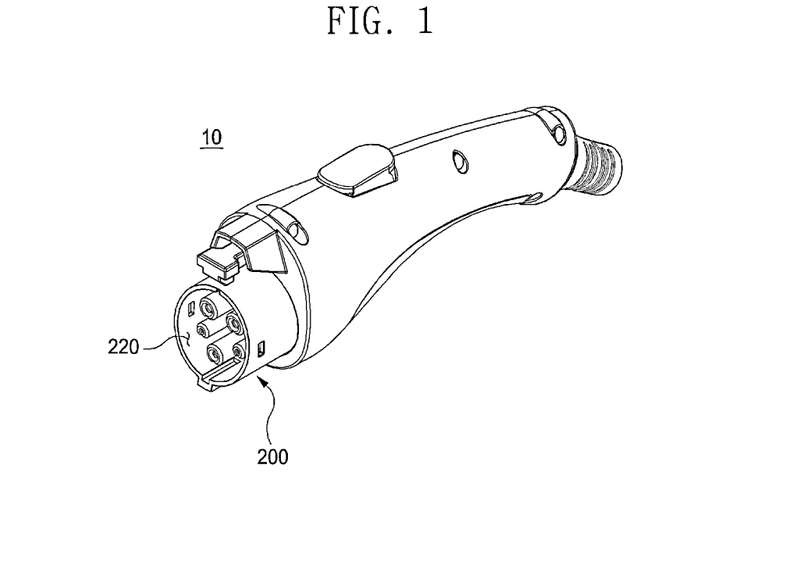
FIG. 1 is a perspective view of a charging connector for a vehicle according to an embodiment of the present invention.
Figure 2:
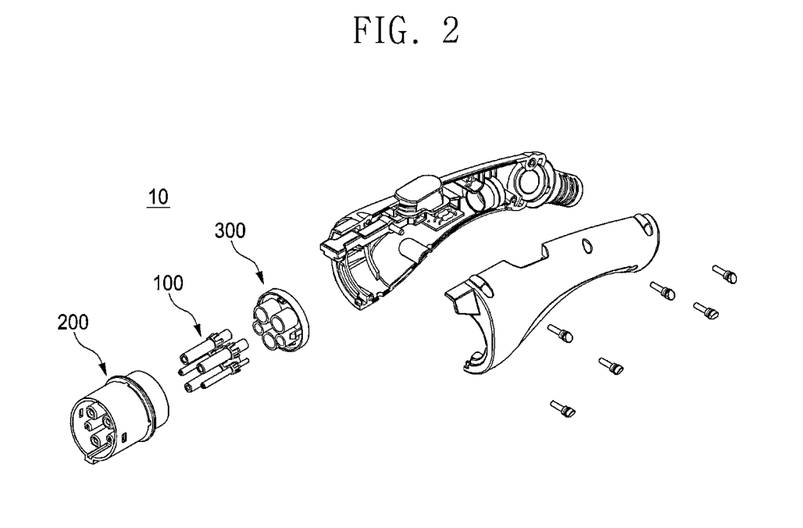
FIG. 2 is an exploded perspective view of FIG. 1.
Figure 3:
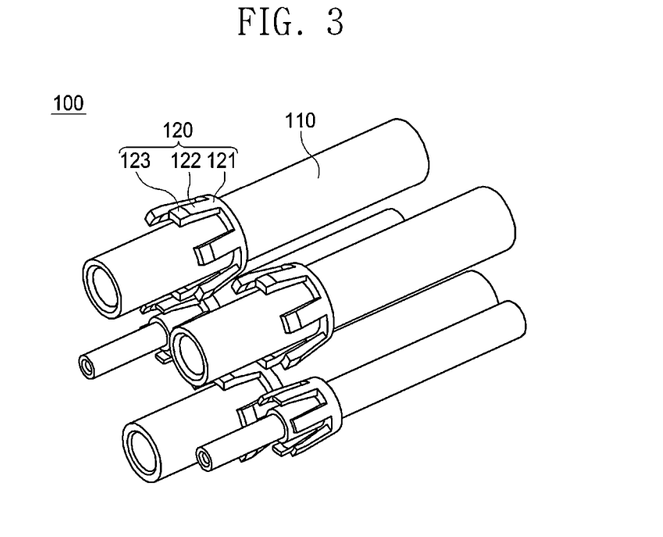
FIG. 3 is a perspective view of an outlet terminal part of FIG. 2.
Figure 4:
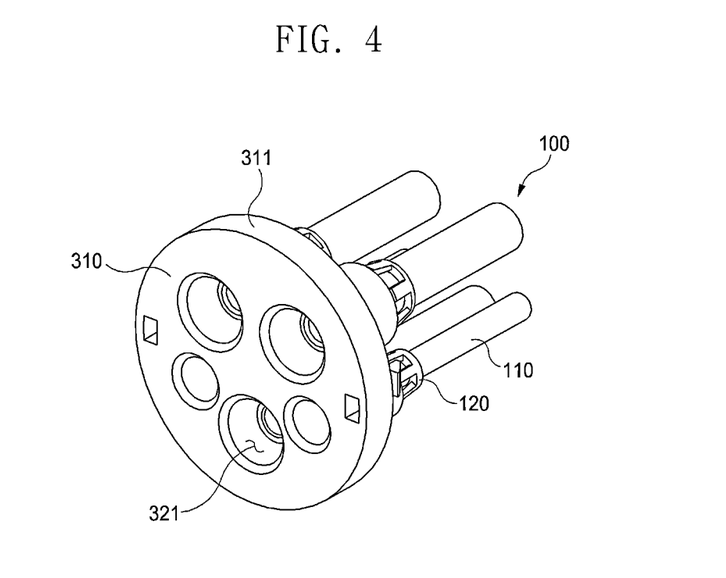
FIG. 4 is a perspective view illustrating a state in which the outlet terminal part is assembled to a rear holder of FIG. 2.
Figure 5:
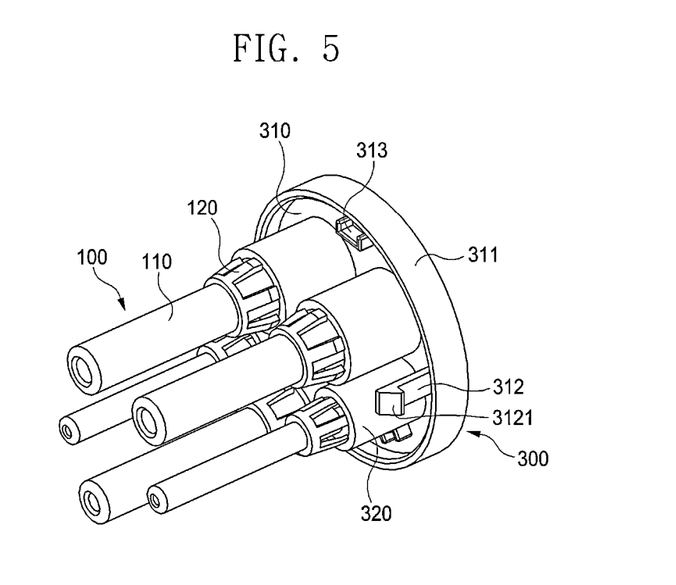
FIG. 5 is a perspective view illustrating a different direction of FIG. 4.
Figure 6:
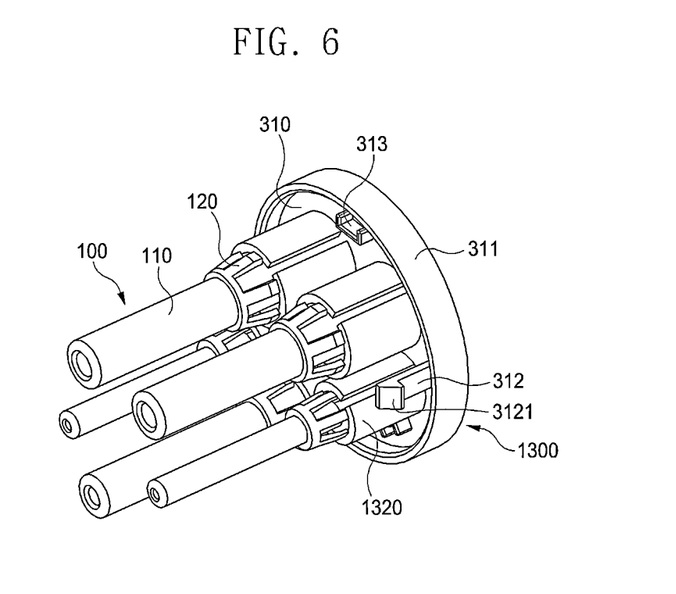
FIG. 6 is a perspective view illustrating a state in which a rear hold is applied according to another embodiment.
Figure 7:
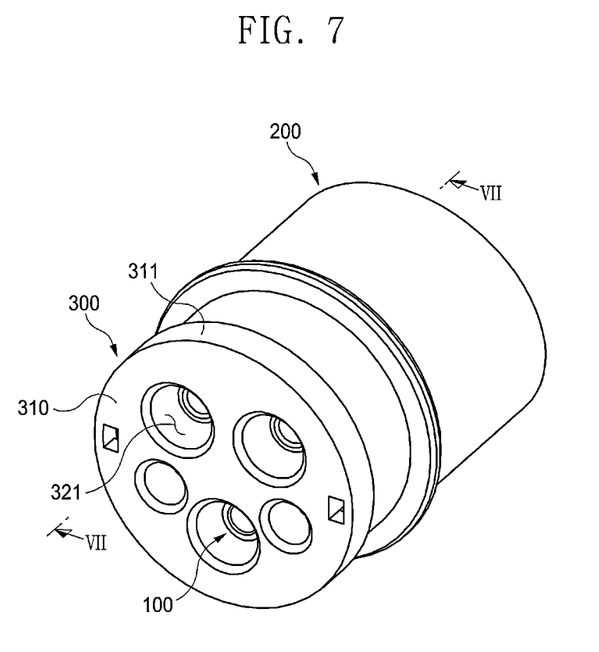
FIG. 7 is a perspective view illustrating a state in which a housing is assembled in FIG. 4.
Figure 8:
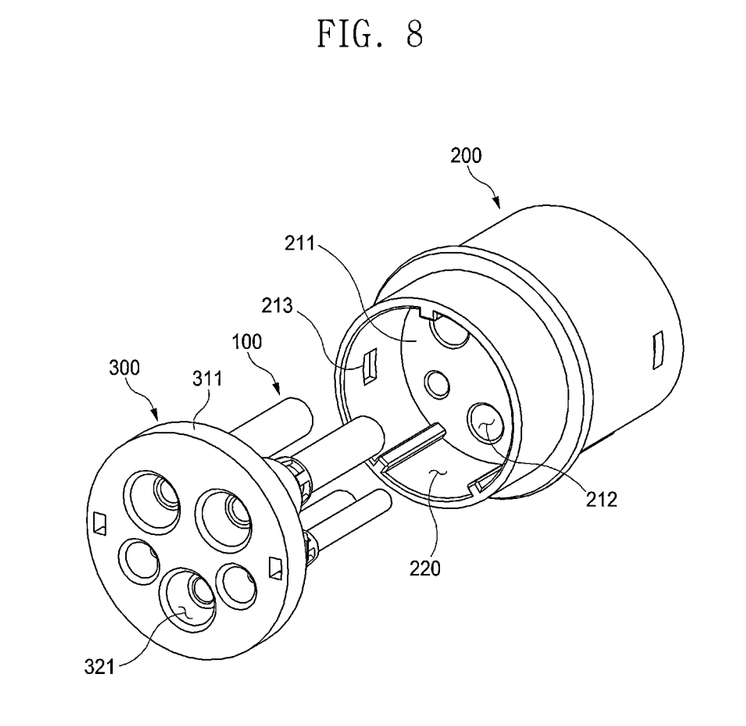
FIG. 8 is an exploded perspective view of FIG. 7.
Figure 9:
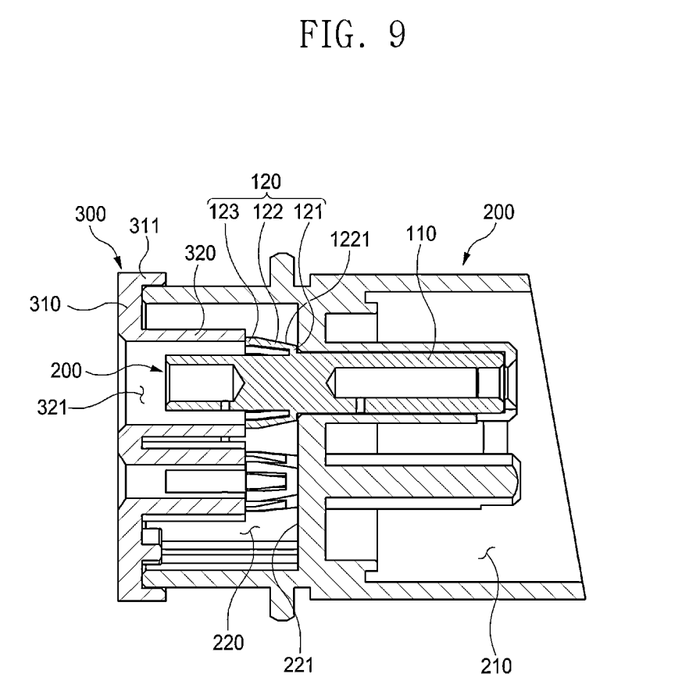
FIG. 9 is a cross-sectional view taken in a direction VII-VII of FIG. 7.
Figure 10:
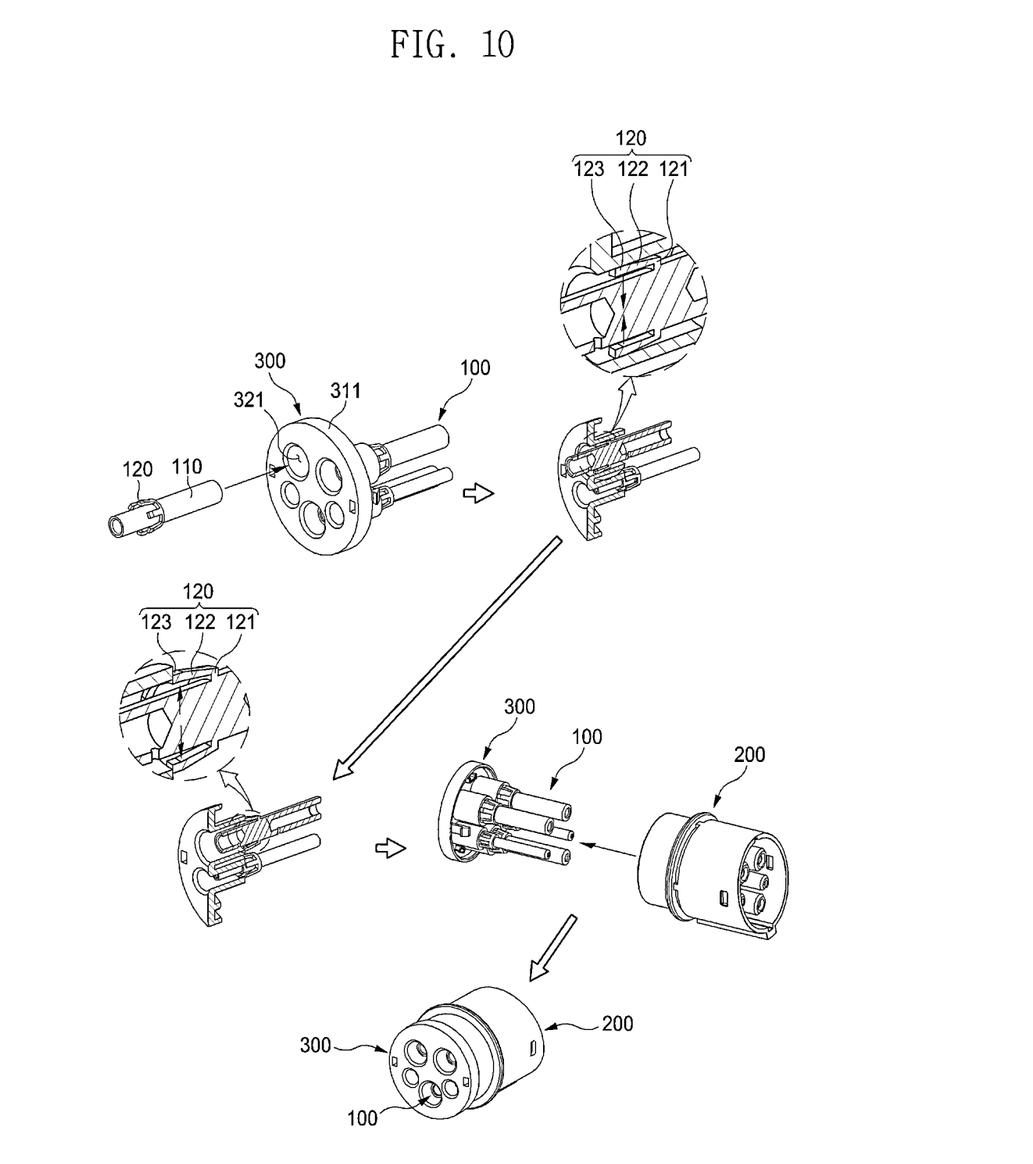
FIG. 10 is a view illustrating a method for assembling an outlet terminal to a rear holder.

FIG. 1 is a perspective view of a charging connector for a vehicle according to an embodiment of the present invention, FIG. 2 is an exploded perspective view of FIG. 1, FIG. 3 is a perspective view of an outlet terminal part of FIG. 2, FIG. 4 is a perspective view illustrating a state in which the outlet terminal part is assembled to a rear holder of FIG. 2, FIG. 5 is a perspective view illustrating a different direction of FIG. 4, FIG. 6 is a perspective view illustrating a state in which a rear hold is applied according to another embodiment, FIG. 7 is a perspective view illustrating a state in which a housing is assembled in FIG. 4, FIG. 8 is an exploded perspective view of FIG. 7, and FIG. 9 is a cross-sectional view taken in a direction VII-VII of FIG. 7, and FIG. 10 is a view illustrating a method for assembling an outlet terminal to a rear holder.

Referring to FIGS. 1 to 10, a charging connector 10 for a vehicle, which is coupled to an inlet charging part of an electric vehicle of the present invention includes an outlet terminal part 100 electrically connected to an inlet terminal part installed inside the inlet charging part, a housing 200 providing an accommodation space 210, in which the outlet terminal part 100 is accommodated, and a coupling space 220 coupled to the inlet terminal part, and a rear holder installed at one side of the housing 200 to prevent the outlet terminal part 100 from being separated. The outlet terminal part 100 is provided with a plurality of charging terminals 110 coupled to the inlet terminal part and a prevention rib 120 extending from the outside of the charging terminal 110 in a radial direction and having a distal end supported at one side of the rear holder 300 to prevent each of the charging terminals 110 from being separated.

The charging connector 10 for the vehicle is connected to an external device and coupled to the inlet charging part provided in the electric vehicle to supply external power, thereby charging a battery. Here, the charging connector is connected so that the inlet terminal part, which is installed inside the inlet charging part, and the outlet terminal part 100 are stably connected to each other.

The outlet terminal part 100 is provided with the plurality of charging terminals 110 coupled to the inlet terminal part and the prevention rib 120 extending to the outside of the charging terminal 110 and is installed to pass through the housing 200. The outlet terminal part 100 has one side connected to an external device through a wire and the other side that is in contact with the inlet terminal part installed inside the inlet charging part to realize electrical connection.

The charging terminal 110 passes through a first connection hole 212 so as to be disposed over the coupling space 220 and the accommodation space 210 so that one end disposed in the accommodation space 210 is disposed inside the housing 200 and electrically connected to the external power source through the wire, and the other end is disposed inside the coupling space 220 and electrically connected to the inlet terminal part. Here, the plurality of charging terminals 110 are respectively installed at pre-designed positions and integrally connected to the inlet terminal part.

The prevention rib 120 extends to the outside of each of the charging terminals 110 so that the outlet terminal part 100 is prevented from the rear holder 300, and also, the other end of the charging terminal 110 is disposed in the coupling space 220 by a pre-designed length to prevent movement in the extension direction, thereby providing more improved electrical stability.

Particularly, the prevention rib 120 is provided with a connection end 121 extending and protruding along an outer circumferential surface of the charging terminal 110, a plurality of elastic cantilevers spaced a predetermined distance from the connection end 121 to extend in the extension direction, and a support end 123 bent from a distal end of each of the elastic cantilevers 121 and disposed parallel to the extension direction.

Here, the connection end 121 protrudes from the circumferential surface of the charging terminal 110 and is supported at one side of a support surface 211, in which a first connection hole 212 is defined, and the support end 123 is supported on a distal end of an extension part 320, which defines a second connection hole 321, to firmly fix the charging terminal 110 at a predetermined position, thereby securing more improved electrical safety and reliability with the inlet terminal part.

Thus, the connection end 121 and the supporting end 123 may be disposed in parallel to the extension direction so as to secure fixing force in the extension direction.

The elastic cantilever 122 extends from the connection end 121 in the extension direction. Here, the elastic cantilever 122 may have an inclined surface 1221 so as to be gradually spaced apart from the outside of the charging terminal 110 in the radial direction. Thus, since the elastic cantilever 122 has elastic force in the radial direction in a state in which the portion to which the connection end 121 is connected is fixed, when the charging terminal 110 passes through the second connection hole 321, the elastic cantilever 122 is elastically deformed to minimize an interference with the second connection hole 321 and also returns to its original position after passing through the second connection hole 321, and thus, the elastic cantilever 122 is hooked and fixed to a distal end of the second connection hole 321 to more facilitate assembly of the plurality of charging terminals 110.

In other words, the outlet terminal part 100 is provided with the prevention rib 120 that is elastically deformed to more easily install the plurality of charging terminals 110, and also, since a separate installation process and a process of adjusting an installation position are not required, a production process is simplified, and workability is improved to significantly improve productivity of the product.

In addition, the outlet terminal part 100 is supported at one side of the housing 200 and one side of the rear holder 300 to improve the fixing force in the extension direction of the charging terminal 110, thereby providing the electrical stability, and also, the outlet terminal part 100 maintains the fixing force to a predetermined level or more even when the inlet charging part and the charging connector 10 for the vehicle are repeatedly detached, thereby improving the reliability of the product.

The coupling space 220 in which one end of the outlet terminal part 100 is accommodated is further defined at one side of the housing 200, and the accommodation space 210 in which the other end of the outlet terminal part 100 is accommodated is defined at the other side of the housing 200. The coupling space 220 and the accommodation space 210 are installed to be divided by the support surface 211 that is in contact with the connection end 121 so that the portion connected to the external device and the device connected to the inlet charging part are divided into each other.

Here, the first connection hole 212 through which each of the charging terminals 110 passes is defined in the support surface 211 so that each of the plurality of charging terminals 110 has a pre-designed pattern. In this case, the first connection hole 212 has a size less than that of the connection end 121 so that the connection end 121 is supported on the support surface 211.

In addition, a coupling groove 213, to which the rear holder 300 is coupled, and a guide protrusion 214 that guides the coupling position of the rear holder 300 are provided inside the accommodation space 210 so that the rear holder 300 is easily coupled in a snap-fit manner, and also, the plurality of charging terminals 110, which are primarily fixed to the rear holder 300, are integrally disposed at designated positions, thereby preventing the inlet charging part and the charging connector 10 for the vehicle from being erroneously coupled to each other.

Here, the coupling groove 213 may be provided in at least a pair to face each other. The guide protrusion 214 may be provided in three pieces that are spaced regular intervals from each other, and the charging terminal 110 may extend in the extension direction and be disposed at a correct position without vertical inversion. In addition, the guide groove 313 defined in the rear holder 300 may move along the guide protrusion 214 so that the guide protrusion 214 is easily coupled.

In addition, when the guide protrusion 214 is provided in plurality, when the inlet charging part and the charging connector 10 for the vehicle are detached from each other, rotation force occurring with respect to a central axis of the housing 200 may be offset to minimize deformation, damage, and the like, which may occur in the inlet terminal part and the outlet terminal part 100.

The rear holder 300 is provided with a body 310 disposed at one side of the accommodation space 210 and an extension part 320, in which a second connection hole 321 extending from the body 310 to communicate with the first connection hole 212 is defined. Thus, the rear holder 300 is disposed outside an opened surface of the accommodation space 210 to protect the charging terminal 110 disposed in the accommodation space 210 and also is disposed to face the support surface 211 to more firmly fix the charging terminal 110.

The body 310 is disposed outside the opened surface of the accommodation space 210 and extends along an outer circumferential surface in the extension direction to provide a protection rib 311 outside the accommodation space 210, thereby protecting the distal end of the housing 200 and also extends in the extension direction to provide a coupling rib 312 inside the accommodation space 210 so that the rear holder 300 is easily coupled and fixed to the housing 200.

Here, a coupling protrusion 3121 hooked and fixed to the coupling groove 213 is disposed on a distal end of the coupling rib 312, and a coupling groove 213 of the coupling protrusion 3121 is hooked and fixed inside the accommodation space 210 to prevent the coupling structure from being exposed to the outside.

Thus, in the production process, the charging terminal 110 is prevented from being damaged due to operator's carelessness, the fixing force of the charging terminal 110 is prevented from being reduced by the repeated use to improve durability of the product and secure the electrical safety.

In addition, a guide groove 313 is defined at one side of the body 310 to correspond to the guide protrusion 214 so that the rear holder 300 and the housing 200 are easily coupled to each other and also is hooked and fixed to the guide protrusion 214 to offset the rotation force, thereby minimizing the damage of the charging terminal 110.

The extension part 320 extends from one side of the body 310 in the extension direction of the accommodation space 210. Here, the second connection hole 321 having the same pattern as the first connection hole 212 is defined inside the extension part 320 so that the outlet terminal part 100 primarily fixed to the rear holder 300 is integrally coupled to the housing 200.

In this case, the second connection hole 321 has a size equal to or greater than that of a portion at which the elastic cantilever 122 connects the plurality of support ends, which are elastically deformed, to each other. Here, a portion at which the elastic cantilever 122 connects the plurality of support ends, which are in a state of returning to its original position, to each other has a small size so that the support end 123 supports the distal end of the second connection hole 321.

In addition, as illustrated in FIG. 5, the extension part 320 according to an embodiment has a cylindrical shape and thus is coupled by the elastic deformation of the elastic cantilever 122 in one direction. However, an extension part 1320 according to another embodiment is cut in the extension direction, in which the charging terminal 110 is coupled, and thus, when the charging terminal 110 is inserted, the extension part 1320 is also elastically deformed together with the elastic cantilever 122 in the radial direction to reduce insertion/extraction force, thereby reducing fatigue of the worker.

Here, a degree of the cutting or the number of times of the cutting of the extension part 1320 may vary according to a design, and such a change corresponds to a matter obvious by the present invention.

Therefore, in the charging connector 10 for the vehicle according to the present invention, the plurality of charging terminals 110 are inserted into the rear holder 300 to primarily fix the charging terminals 110, and also, the charging terminals 110 and the rear holder 300 are integrally coupled to the housing 200 to simplify the production process, thereby improving the productivity.

In addition, the various structures for preventing the charging terminal 110 from moving are provided to secure the stability and reliability of the charting connector 10 for the vehicle with the inlet charging part. Also, when repeatedly detached, the damage that may occur in the charging connector 10 for the vehicle, is minimized, and also, the fixing force is prevented from being reduced to improve the durability and the stability.

As described above, various effects including the following facts may be expected according to the technical problems of the present invention. However, the present invention is unnecessary to allow all of the following effects to be exerted.

The charging connector of the present invention may be assembled to the housing in the state in which the plurality of charging terminals are installed in the rear holder to simplify the production process and improve the product productivity by reducing the worker fatigue.

In addition, the prevention rib provided in the radial direction may be disposed on the outlet terminal part so that the plurality of charging terminals are stably fixed to the rear holder, and also, the charging terminal protrudes by the pre-designed length in the coupling space to improve the electrical stability with the inlet terminal part.

Here, the prevention rib may be provided as the plurality of elastic cantilevers extending from the outside of the charging terminal so that the worker easily fixes the outlet terminal part to the rear holder without performing the separate process, and the guide protrusion protruding to guide the installation position of the rear holder may be disposed in the accommodation space to maximize the effect of improving the product productivity.

In the above, preferred embodiments of the present invention have been exemplarily described, but the scope of the present invention is not limited to such specific embodiments, and those that can be appropriately changed within the scope described in the claims belong to the protection scope of the present invention.

What is claimed is:

1. A charging connector for a vehicle, which is coupled to an inlet charging part of an electrical vehicle, the charging connector comprising:
    an outlet terminal part electrically connected to an inlet terminal part installed inside the inlet charging part;
    a housing configured to provide an accommodation space, in which the outlet terminal part is accommodated, and a coupling space coupled to the inlet terminal part; and
    a rear holder installed at one side of the housing to prevent the outlet terminal part from being separated,
    wherein the outlet terminal part comprises:
        a plurality of charging terminals coupled to the inlet terminal part; and
        a prevention rib extending from the outside of the charging terminal in an extension direction and having a distal end supported at one side of the rear holder to prevent the charging terminal from begin separated,
    wherein the prevention rib formed on each of the charging terminals comprises;
        a connection end protruding along an outer circumferential surface of each of the charging terminals;
        a plurality of elastic cantilevers spaced a predetermined distance from the connection end to extend in the extension direction; and
        a support end bent from a distal end of each of the elastic cantilevers and disposed to face the extension part, and
    wherein the prevention rib is primarily fixed to a rear holder, and the outlet terminal part and the rear holder are integrally fastened to the housing.

2. The charging connector of claim 1, wherein the housing has a first connection hole so that the plurality of charging terminals are installed in a predetermined pattern,
    the rear holder comprises a body disposed outside the accommodation space and an extension part having a second connection hole that extends to the inside of the accommodation space to communicate with the first connection hole, and
    in the outlet terminal part, the charging terminals are disposed to pass through the first and second connection holes,
    wherein a distal end of the prevention rib is supported on the distal end of the extension part and disposed in the accommodation space.

3. The charging connector of claim 2,
    wherein the outlet terminal part passes through the second connection hole and is disposed in the accommodation space.

4. The charging connector of claim 3, wherein the elastic cantilever extends from the connection end,
    wherein the elastic cantilever has an inclined surface extending from the outer circumferential surface of the charging terminal so as to be gradually spaced apart in the radial direction.

5. The charging connector of claim 2, wherein the rear holder comprises:
    a protection rib extending from the body to the outside of the accommodation space to protect a distal end of the housing; and
    a coupling rib extending to the outside of the accommodation space and provided with a hook protrusion at a distal end thereof so as to be hooked and fixed to a coupling groove defined in the accommodation space.

* * * * *